(12) United States Patent
Nadeau-Dostie et al.

(10) Patent No.: US 11,789,487 B2
(45) Date of Patent: Oct. 17, 2023

(54) ASYNCHRONOUS INTERFACE FOR TRANSPORTING TEST-RELATED DATA VIA SERIAL CHANNELS

(71) Applicant: Siemens Industry Software Inc., Plando, TX (US)

(72) Inventors: Benoit Nadeau-Dostie, Gatineau (CA); Jean-Francois Cote, Davie, FL (US)

(73) Assignee: Siemens Industry Software Inc., Plano, TX (US)

( * ) Notice: Subject to any disclaimer, the term of this patent is extended or adjusted under 35 U.S.C. 154(b) by 67 days.

(21) Appl. No.: 17/498,085

(22) Filed: Oct. 11, 2021

(65) Prior Publication Data

US 2023/0110161 A1    Apr. 13, 2023

(51) Int. Cl.
*G06F 1/12* (2006.01)
*G06F 1/06* (2006.01)

(52) U.S. Cl.
CPC . *G06F 1/12* (2013.01); *G06F 1/06* (2013.01)

(58) Field of Classification Search
CPC .................................. G06F 1/10; G06F 1/12
See application file for complete search history.

(56) References Cited

U.S. PATENT DOCUMENTS

| | | | |
|---|---|---|---|
| 5,900,753 A | 5/1999 | Cote et al. | |
| 7,761,755 B1 * | 7/2010 | Payakapan | G01R 31/31922 714/724 |
| 8,862,954 B1 * | 10/2014 | Wang | G01R 31/3177 714/731 |
| 11,409,931 B1 * | 8/2022 | Kaur | G06F 30/333 |
| 2002/0147951 A1 * | 10/2002 | Nadeau-Dostie | G01R 31/318552 714/731 |
| 2011/0260767 A1 * | 10/2011 | Devta-Prasanna | G01R 31/318552 327/285 |
| 2013/0117618 A1 * | 5/2013 | Kukreja | G01R 31/318552 714/E11.148 |
| 2014/0035645 A1 * | 2/2014 | Narayanan | G11C 29/32 327/212 |
| 2020/0124665 A1 * | 4/2020 | de Bakker | G01R 31/31726 |

\* cited by examiner

*Primary Examiner* — Phil K Nguyen

(57) ABSTRACT

A circuit comprises: a first clock gating device clocked by a first clock signal and configured to generate first clock pulses when a shift enable signal is active, a first transition detecting device clocked by a second clock signal and configured to generate shift gating pulses when detecting active transitions of the first clock pulses, a second clock gating device clocked by the second clock signal and configured to generate shift clock pulses based on the shift gating pulses to clock second scan elements for a shift operation with first scan elements clocked by the first clock signal, and a first retiming device triggered by active pulse edges of the first clock signal and configurable to hold a value for the shift operation. The circuit may further comprise a delay generating device configured to generate delayed shift gating pulses for generating the shift clock pulses.

16 Claims, 14 Drawing Sheets

ASYNCHRONOUS INTERFACE FOR TRANSPORTING TEST-RELATED DATA VIA SERIAL CHANNELS

FIELD OF THE DISCLOSED TECHNIQUES

The presently disclosed techniques relate to circuit test. Various implementations of the disclosed techniques may be particularly useful for interfacing asynchronous clock domains for test-related data transportation.

BACKGROUND OF THE DISCLOSED TECHNIQUES

During a circuit test, test-related data such as test control data are often transported via serial channels across clock domains. The test access port (TAP) complying with the IEEE 1149.1 Standard implements a serial communications interface for test access. The TAP allows initializing and may be collecting results of test controllers in various circuit modules under test. However, interfacing a TAP and test controllers having different clock speeds presents a challenge because the TAP is typically clocked by a clock signal (TCK) running much slower than a system clock signal for a circuit module and the two clock signals are also asynchronous in general.

To address the challenge, the circuit module under test may use a multiplexer to substitute its system clock signal with the TAP clock signal during the serial data transportation, commonly referred to as a shift operation. Once the data has been loaded in the registers, the circuit module clock signal is switched back to the original clock frequency while the registers are placed in a holding mode. The holding mode is needed because unintended clock pulses are likely to occur at the transition time due to the unknown phase relationship between the clock signals in most systems. This method has a drawback in that the normal system function is interrupted while the data transfer takes place, but some of the test functions require the system to be running normally. Another drawback is that in many high-speed applications, a phase-lock loop (PLL) is used to compensate phase differences between the input and output of the circuit. The PLL may take a long time to resynchronize after it has been disabled for the duration of the serial data transfer. There may be some methods that can ameliorate the impact of these two drawbacks, but clock substitution-based approaches cannot be easily applied to circuits using a clock mesh for distributing the clock signal.

A second method for interfacing asynchronous clock domains is to use "shadow" registers clocked by the clock signal of the TAP, i.e., duplicating flip-flops for the test controller. To initialize the test controller, data is first shifted into the shadow register. When all the data has been shifted in, the register is put in a holding mode similar to the one described above or the TAP clock signal is stopped. A signal from the TAP indicating that the data is ready to be transferred is sent to the test controller which resynchronizes it by sampling. The synchronized signal is then distributed to the flip-flops for the test controller which can capture the data loaded in the shadow register. A similar process can be used to send data back to the TAP. The main drawback of this method is its relatively high cost of silicon area arising from the duplication of all of the flip-flops for the test controller.

U.S. Pat. No. 5,900,753, titled "Asynchronous Interface," discloses an improved asynchronous interface. The improved asynchronous interface comprises a first circuit configured to derive a synchronization pulse based on a test clock signal (e.g., TCK) and a system clock signal, a second circuit configured to derive a synchronized hold signal based on a hold signal and the synchronization pulse, and a third circuit configured to derive a synchronized shift signal based on a shift signal and the synchronization pulse. The synchronized hold signal and the synchronized shift signal are then used to retime the register associated with the test controller for the shift operation. One drawback of this asynchronous interface is its sensitivity to the frequency ratio of the two clock signals and the duty cycle of the slow clock signal (typically the test clock signal).

FIG. 12 illustrates an example of a diagram showing shift time of the register associated with the test controller as a function of frequency ratio of the system clock signal over TCK for some TCK duty cycles for an asynchronous interface according to an embodiment of the technology disclosed in U.S. Pat. No. 5,900,753. The shift time of the register associated with the test controller is measured as a fraction of the test clock signal (TCK) period. 50% of the test clock signal (TCK) period is considered to be the optimal position for the shift time since it offers good tolerance for both hold-time errors and set-up time errors. Each of the TCK duty cycles has three curves: a top one representing the maximum values, a middle one representing the average values, and a bottom one representing the minimum values. FIG. 12 shows that the shift time of the register associated with the test controller varies significantly with the frequency ratio, especially for the frequency ratio smaller than 10. The shift time of the register associated with the test controller also changes drastically with the TCK duty cycle. The asynchronous interface cannot even function if the TCK duty cycle is 25% and the frequency ration is below 10. Only for high frequencies and duty cycles of either 50% or 75%, the shift time of the register associated with the test controller is not too far away from the optimal point— 50% of the test clock signal (TCK) period.

BRIEF SUMMARY OF THE DISCLOSED TECHNIQUES

Various aspects of the disclosed technology relate to an interfacing circuit for a scan network across asynchronous clock domains. In one aspect, there is a circuit configurable to interface first scan elements in a first clock domain clocked by a first clock signal and second scan elements in a second clock domain clocked by a second clock signal to form a whole or portion of a scan chain for a shift operation, comprising: a first clock gating device clocked by the first clock signal and configured to generate one or more first clock pulses when a shift enable signal is active; a first transition detecting device clocked by the second clock signal and configured to generate one or more shift gating pulses when detecting active transitions of the one or more first clock pulses, width of each of the one or more shift gating pulses being equal to a clock period of the second clock signal; a second clock gating device clocked by the second clock signal and configured to generate one or more shift clock pulses based on the one or more shift gating pulses to clock the second scan elements for the shift operation; and a first retiming device triggered by active pulse edges of the first clock signal and configurable to hold a value to be shifted into one of the second scan elements from one of the first scan elements for each of the one or more first clock pulses during the shift operation.

The circuit may further comprise: a delay generating device clocked by the second clock signal and configured to delay each of the one or more shift gating pulses by a number of clock cycles of the second clock signal to generate one or more delayed shift gating pulses based on control signals, one of the control signals being a delay length signal indicating the number of clock cycles of the second clock signal.

The delay generating device may comprise: a multiplexer configured to select either the one or more shift gating pulses or the one or more delayed shift gating pulses as an output signal of the delay generating device based on a delay selection signal in the control signals; and a first counter clocked by the second clock signal and configured to generate the one or more delayed shift gating pulses based on the delay length signal, the one or more shift gating pulses being coupled to an initiation input of the first counter, each of the one or more shift gating pulses causing the first counter to start counting when the delay selection signal causes the multiplexer to select the one or more delayed shift gating pulses as the output signal of the delay generating device.

The delay length signal and the delay selection signal may be supplied by a register in the first clock domain.

The delay selection signal may cause the multiplexer to select the one or more delayed shift gating pulses as the output signal of the delay generating device when frequency of the second clock signal is at least six times higher than frequency of the first clock signal.

The first clock gating device may be further configured to generate one first clock pulse when a capture enable signal is active, and the delay generating device may comprise: a delay-length determining device configured to generate the delay length signal and the delay selection signal based on two pulses: a capture status pulse generated by the first transition detecting device when detecting an active transition of the one first clock pulse and a first shift gating pulse in the one or more shift gating pulses.

The delay-length determining device may comprise: a second transition detecting device clocked by the second clock signal and configured to generate a scan mode pulse when detecting a transition of a scan mode signal, width of the scan mode pulse being equal to a clock period of the second clock signal; a second counter clocked by the second clock signal and configured to generate the delay length signal and the delay selection signal based on the scan mode pulse and an increment signal, the second counter stopping counting when the increment signal is inactive; and a finite state machine clocked by the second clock signal and configured to generate the increment signal and a decrement signal and to block the capture status pulse but allow the one or more shift gating pulses to be coupled to the initiation input of the first counter, wherein the scan mode pulse causes both the increment signal and the decrement signal to be inactive, the capture status pulse causes only the increment signal to be active, and the first shift gating pulse causes the increment signal to be inactive and the decrement signal to be active.

Alternatively, the circuit may further comprise: a second retiming device triggered by inactive pulse edges of the first clock signal, an input of the second retiming device being coupled to a serial output of the one of the first scan elements; a first multiplexer configured to select either an output of the first retiming device or an output of the second retiming device as a signal to be coupled to a serial input of the one of the second scan elements based on a retiming mode signal; a third retiming device triggered by inactive pulse edges of the first clock signal, an input of the third retiming device being coupled to a serial output of one of the second scan elements; and a second multiplexer configured to select either an output of the third retiming device or the serial output of one of the second scan elements as a signal to be coupled to a serial input of one of the first scan elements based on the retiming mode signal.

In another aspect, there is one or more computer-readable media storing computer-executable instructions for causing a computer to perform a method, the method comprising: creating, in a circuit design, the above circuit.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed techniques. Thus, for example, those skilled in the art will recognize that the disclosed techniques may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNIQUES

Various aspects of the disclosed technology relate to an interfacing circuit for a scan network across asynchronous clock domains. In the following description, numerous details are set forth for the purpose of explanation. However, one of ordinary skill in the art will realize that the disclosed technology may be practiced without the use of these specific details. In other instances, well-known features have not been described in details to avoid obscuring the disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

The detailed description of a method or a device sometimes uses terms like "couple" and "generate" to describe the disclosed method or the device function/structure. Such terms are high-level descriptions. The actual operations or functions/structures that correspond to these terms will vary depending on the particular implementation and are readily discernible by one of ordinary skill in the art.

As used in this disclosure, the singular forms "a," "an," and "the" include the plural forms unless the context clearly dictates otherwise. Additionally, the term "includes" means "comprises." Moreover, unless the context dictates otherwise, the term "coupled" means electrically or electromagnetically connected or linked and includes both direct connections or direct links and indirect connections or indirect links through one or more intermediate elements not affecting the intended operation of the circuit.

Figure 1:
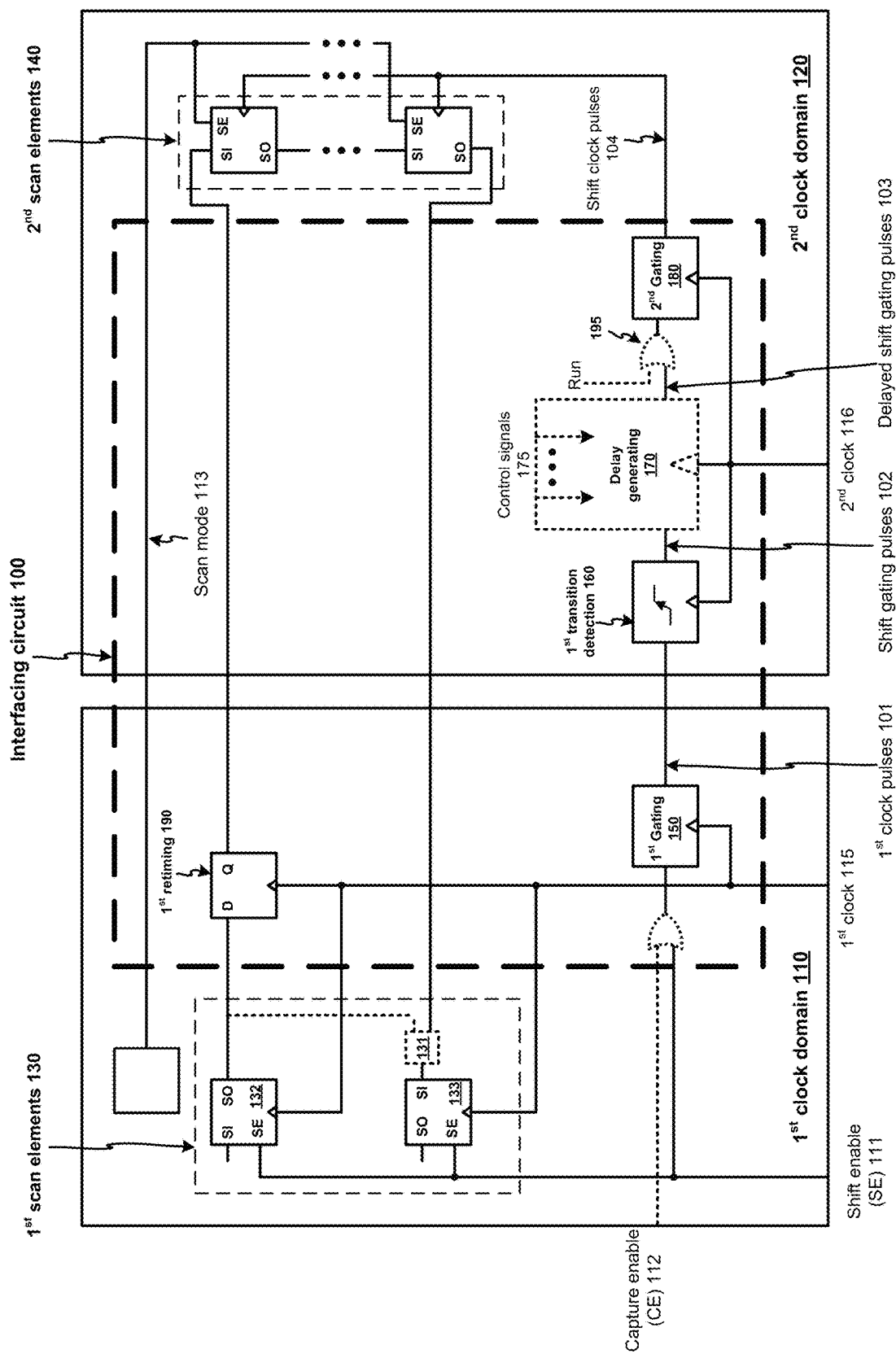
FIG. 1 illustrates an example of a block diagram of an interfacing circuit and its associated circuitry according to various embodiments of the disclosed technology.

FIG. 1 illustrates an example of a block diagram of an interfacing circuit 100 and its associated circuitry according to various embodiments of the disclosed technology. The interfacing circuit 100 is configurable to interface first scan elements 130 in a first clock domain 110 and second scan elements 140 in a second clock domain 120. Devices in the first clock domain 110 are clocked by a first clock signal 115, and devices in the second clock domain 120 clocked by a second clock signal 116. The first scan elements 130 and the second scan elements 140 can form a whole or portion of a scan chain for a shift operation. The scan chain may be a part of an IJTAG network. An IJTAG network is a reconfigurable scan networks conforming to IEEE 1687-2014 and IEEE 1149.1-2013. Being dynamically reconfigurable, an IJTAG network can minimize the time of shift operations needed for operating the desired functional units such as setting up aspects of test modes of a circuit. In the figure, a device 131 in combination with the device 133 can function as a SIB (Segment Insertion Bit) of the IJTAG network, switching between two scan paths that includes or excludes the second scan elements 140. The first clock signal 115 can be the TCK clock signal for the IJTAG network.

A scan mode signal 113 generated in the first clock domain 110 can serve as the scan enable signal for the second scan elements 140. The scan mode signal 113 may be derived based on an update enable signal (UE) used by the IJTAG network. The second scan elements 140 can transport test-related data to and from one or more test controllers in the second clock domain 120. While only two scan elements 132 and 133 are shown in the figure, the first scan elements 130 can have many more scan elements. Both the first scan elements 130 and the second scan elements 140 can be implemented using flip flops or other state elements.

The interfacing circuit 100 comprises a first clock gating device 150, a first transition detecting device 160, a second clock gating device 180, and a first retiming device 190. The first clock gating device 150 and the first retiming device 190 are clocked by the first clock signal 115 while the first transition detecting device 160 and the second clock gating device 180 are clocked by the second clock signal 116. The first clock gating device 150 is configured to generate one or more first clock pulses 101 when a shift enable signal 111 is active. In some embodiments of the disclosed technology, which will be described in detail below, a capture enable signal 112 is also used to allow the pulse of the first clock signal 115 associated with a capture operation to pass through.

The first transition detecting device 160 is configured to generate one or more shift gating pulses 102 when detecting active transitions of the one or more first clock pulses 101. The width of each of the one or more shift gating pulses 102 is equal to a clock period of the second clock signal 116. The second clock gating device 180 is configured to generate one or more shift clock pulses 104 based on the one or more shift gating pulses 102 to clock the second scan elements 140 for the shift operation. Alternatively, a delay generating device 170 may be employed (shown using dotted lines in the figure) to generate the one or more delayed shift clock gating pulses 103 based on the one or more shift gating pulses 102, and then the second clock gating device 180 can generate the one or more shift clock pulses 104 based on the one or more delayed shift clock gating pulses 103.

To control the register associated with the test controller for a shift operation, the interfacing circuit disclosed in the previously mentioned U.S. Pat. No. 5,900,753 generates a synchronized hold signal and a synchronized shift signal. By contrast, the interfacing circuit 100 in FIG. 1 selects the one or more shift clock pulses 104 from the second clock signal 116 to clock the second scan elements 140 for a shift operation. The combination of the first transition detecting device 160 and the second clock gating device 180 ensures that the one or more shift clock pulses 104 in the second clock domain are in synchronization with the one or more first clock pulses 101 which are the corresponding shift clock pulses in the first clock domain 110. In a high-speed circuit, transmitting clock pulses like the one or more shift clock pulses 104 is more reliable than transmitting control signals like the synchronized shift signal used the interfacing circuit disclosed in the U.S. Pat. No. 5,900,753.

Figure 8:
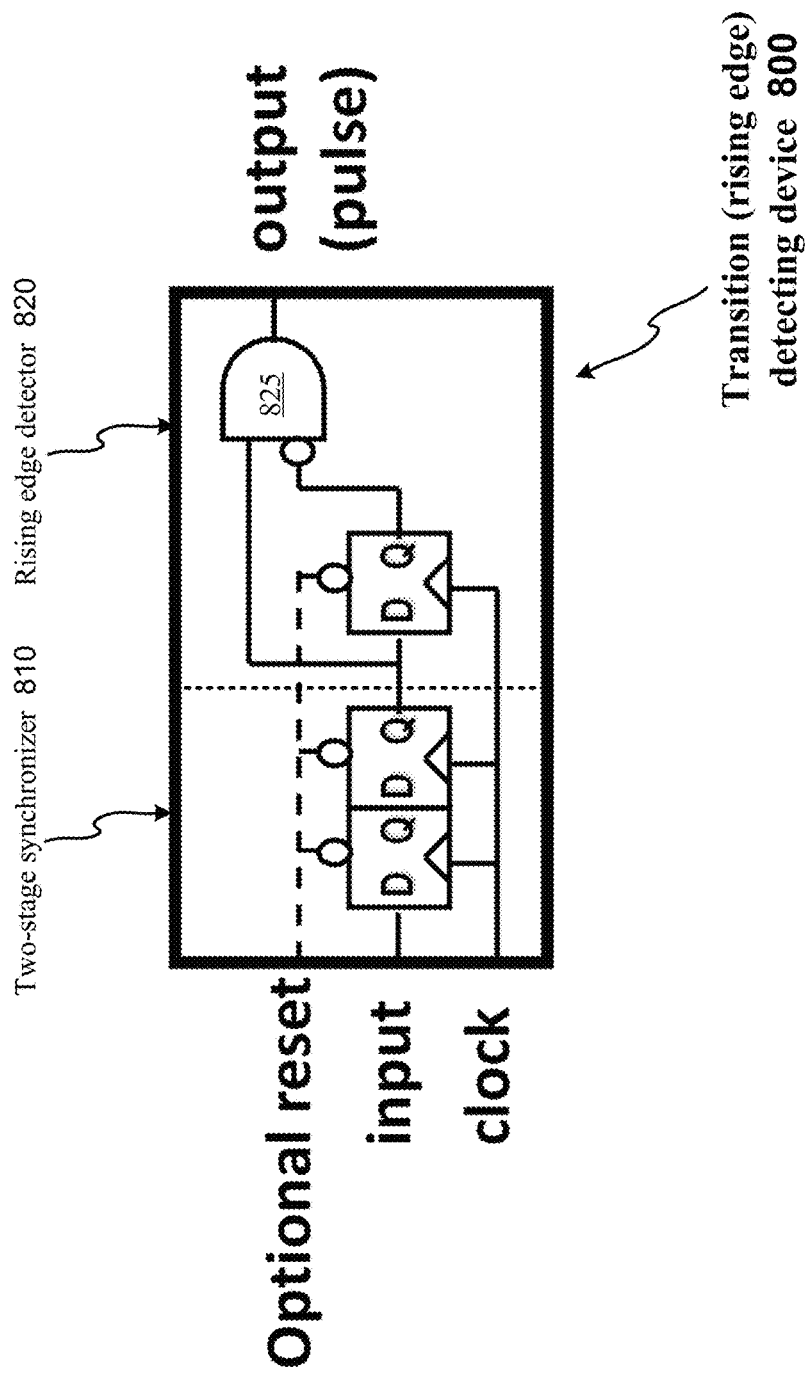
FIG. 8 illustrates an example of a transition detecting device that can be used to implement the first transition detecting device in the interfacing circuit according to various embodiments of the disclosed technology.

Each of the one or more shift gating pulses 102 can be delayed by one or more clock cycles of the second clock signal 116 with respect to the corresponding one of the one or more first clock pulses 101. State elements are often used in a transition detecting device, which can cause a pulse representing a detected transition to lag the transition by a few clock cycles. FIG. 8 illustrates an example of a transition detecting device 800 that can be used to implement the first transition detecting device 160 according to various embodiments of the disclosed technology. The transition detecting device 800 comprises a two-stage synchronizer 810 and a rising edge detector 820. The two-stage synchronizer 810 uses two flip flops to avoid metastability of the input signal (the one or more first clock pulses 101 in FIG. 1). Due to these two flip flops, the output of the rising edge detector 820 does not changes from 0 to 1 until one clock cycle later after the two-stage synchronizer 810 senses a change from 0 to 1 at its input.

Since the one or more shift clock pulses 104 can be delayed at least by the transition detecting device detection 160, the first retiming device 190 is configured to hold a value shifted out from the scan element 132 after each shift clock pulse so that one of the second scan elements 140 can receive it even after the scan element 132 changes its stored value. In FIG. 1, the first retiming device 190 is triggered by active pulse edges of the first clock signal 115.

As FIG. 1 shows, the interfacing circuit 100 may further comprise a delay generating device 170. The delay generating device 170 is clocked by the second clock signal 116 and is configured to delay each of the one or more shift gating pulses 102 by a number of clock cycles of the second clock signal 116 based on control signals 175. The generated one or more delayed shift gating pulses 103, rather than the one or more shift gating pulses 102, are used by the second gating device 180 to gate the second clock signal 116, resulting in the one or more shift clock pulses 104. One of the control signals 175 is a delay length signal indicating the number of clock cycles of the second clock signal 116 to be added to the delay of the one or more shift gating pulses 102 with respect to the one or more first clock pulses 101. According to various implementations of the disclosed technology, the delay length signal can be determined based on the frequency ratio of the second clock signal 116 vs. the first clock signal 115. In this way, the added delay can ensure the shift time in the second time domain 120 to be near the optimal point—50% of the clock period for first clock signal 115 for various frequency ratios, reducing the sensitivity of the interfacing circuit 100 to the frequency ratio of the two clock signals associated with the technologies disclosed in the prior art reference.

Figure 2:
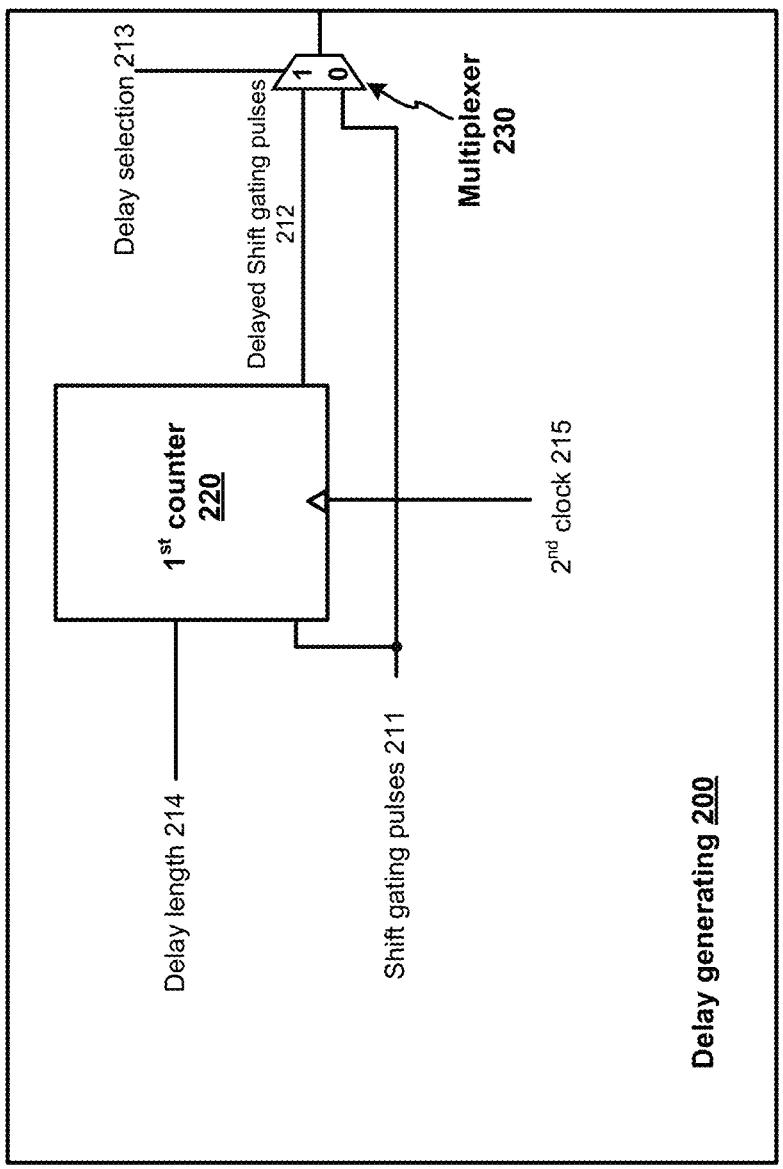
FIG. 2 illustrates an example of a block diagram of a delay generating device according to various embodiments of the disclosed technology.

FIG. 2 illustrates an example of a block diagram of a delay generating device 200 that can be used to implement the delay generating device 170 shown in FIG. 1 according to various embodiments of the disclosed technology. The delay generating device 200 comprises a multiplexer 230 and a first counter 220 clocked by a second clock signal 215. The multiplexer 230 is configured to select, based on a delay selection signal 213, either one or more shift gating pulses 211 or one or more delayed shift gating pulses 212 as an output signal of the delay generating device 200. The first counter 220 is configured to generate the one or more delayed shift gating pulses 212 based on a delay length signal 214. Both the delay length signal 214 and the delay selection signal 213 are examples of the control signals 175 shown in FIG. 1.

The one or more shift gating pulses 211 can be coupled to an initiation input of the first counter 220. Each of the one or more shift gating pulses can cause the first counter 220 to start counting when the delay selection signal 213 causes the multiplexer 230 to select the one or more delayed shift gating pulses 212 as the output signal of the delay generating device 200. The first counter 220 may be implemented using a down counter. The down counter can be configured to count down from a value equal to the delay length 214 or the difference between the delay length 214 and an offset value. The offset value may be set based on the delay caused by other devices in the interfacing circuit such as the first transition detection device 160 shown in FIG. 1.

Figure 3:
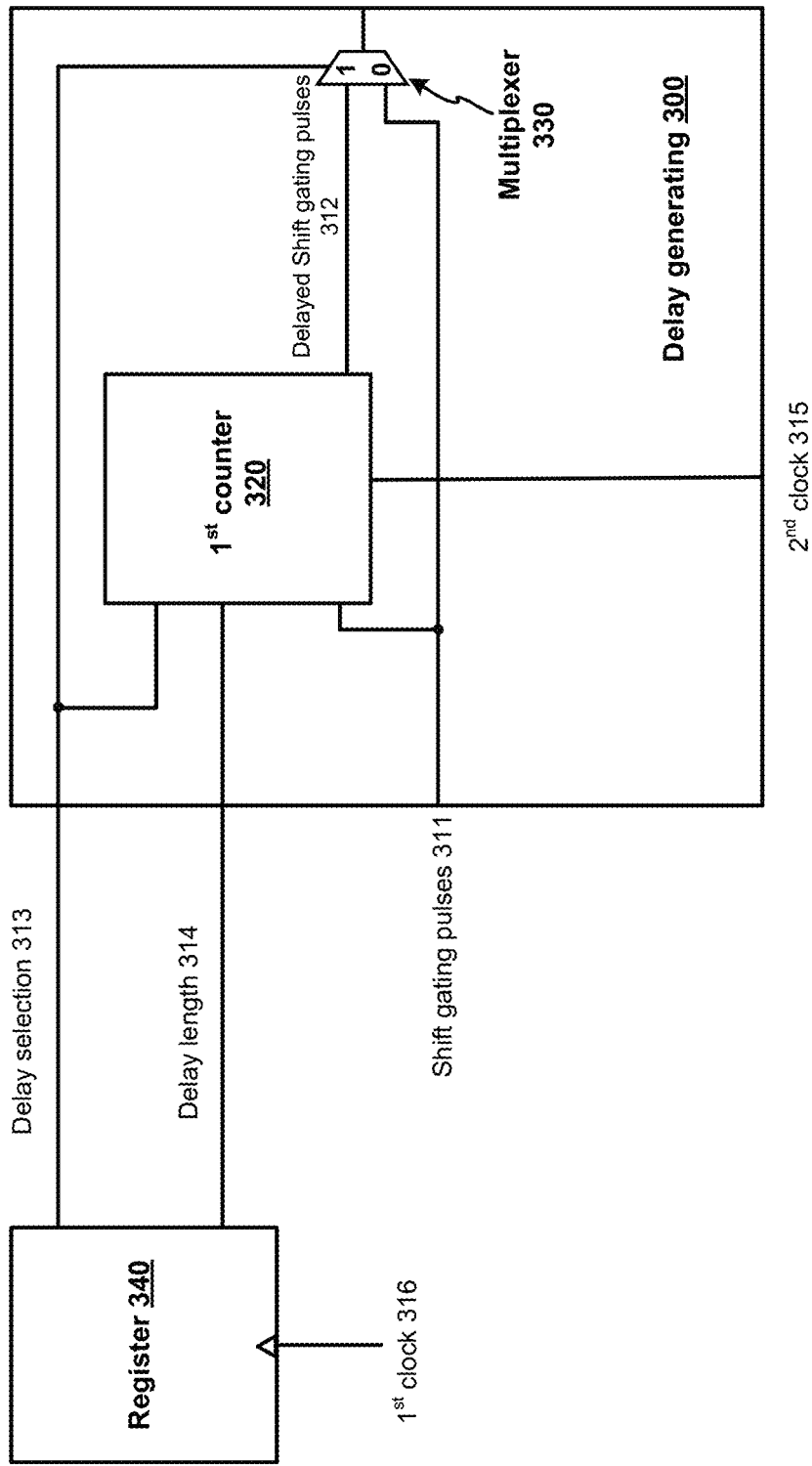
FIG. 3 illustrates an example of a block diagram of a delay generating device along with a register serving as a source of control signals according to various embodiments of the disclosed technology.

FIG. 3 illustrates an example of a block diagram of a delay generating device 300 along with a register 340 serving as a source of the control signals for the delay generating device 300 according to various embodiments of the disclosed technology. Like the delay generating device 200 in FIG. 2, the delay generating device 300 comprises a first counter 320 clocked by a second clock signal 315 and a multiplexer 330. The register 340 is configured to supply a delay length signal 314 and a delay selection signal 313 to the delay generating device 300. When the delay selection signal 313 causes the multiplexer 330 to select one or more delayed shift gating pulses 312 as the output signal of the delay generating device 300, each of one or more shift gating pulses 311 cause the first counter 320 to start a counting cycle. The delay length signal 314 determines the length of each counting cycle and thus the amount of the delay to be added to each of the one or more shift gating pulses 311. The delay length signal 314 and the delay selection signal 313 can be delivered to the register 340 via a scan chain, a data streaming network, or a combination thereof. An example is the scan chain comprising the first scan elements 130 shown in FIG. 1. An example of the data streaming network is described in a PCT (Patent Cooperation Treaty) international application No. PCT/US2021/038797, filed on Jun. 24, 2021, titled "High Bandwidth IJTAG Through High Speed Parallel Bus," and naming Jean-Francois Cote et al. as inventors, which application is incorporated entirely herein by reference. The register 340 can also supply the delay length signal 314 and the delay selection signal 313 to more than one interfacing circuits. Some may be located in in different time domains.

Figure 4:
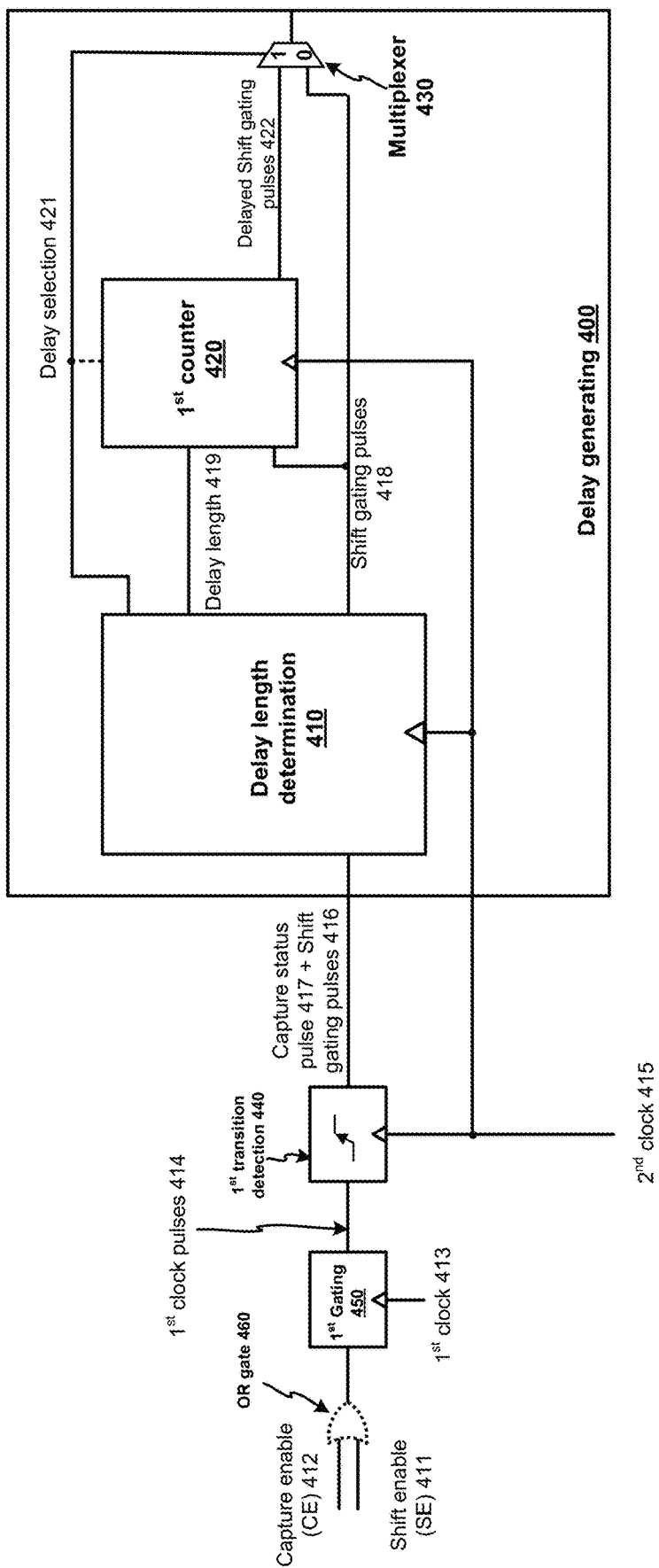
FIG. 4 illustrates an example of a block diagram of a delay generating device configured to generate some or all of the control signals locally according to various embodiments of the disclosed technology.

FIG. 4 illustrates an example of a block diagram of a delay generating device 400 configured to generate some or all of the control signals locally according to various embodiments of the disclosed technology. Like the delay generating device 200 in FIG. 2 and the delay generating device 300 in FIG. 3, the delay generating device 400 comprises a first counter 420 clocked by a second clock signal 415 and a multiplexer 430. The delay generating device 400 is also shown to further comprise a delay length determination device 410. Clocked by the second clock signal 415, the delay-length determining device 400 is configured to generate a delay length signal 419 and a delay selection signal 421 based on two pulses: a capture status pulse 417 and a first shift gating pulse in one or more shift gating pulses 416. Both the capture status pulse 417 and the one or more shift gating pulses 416 are generated by a first transition detection device 440 based on first clock pulses 414. The first clock pulses 414 are generated by a first gating device 450 based on an output of an OR gate 460. Two inputs of the OR gate 460 are a capture enable signal 412 and a shift enable signal 411. The first gating device 450 and the first transition detection device 440 are clocked by a first clock signal 413.

The first transition detection device 440 generates the capture status pulse 417 while detecting an active transition of one of the first clock pulses 414 outputted by the first gating device 450 when the capture enable signal 412 is active. The first transition detection device 440 generates the one or more shift gating pulses 416 while detecting active transitions of rest of the first clock pulses 414 outputted by the first gating device 450 when the shift enable signal 411 is active. Typically, a capture operation is followed by a shift operation for an IJTAG network. The frequency ratio of the second clock signal 415 vs. the first clock signal 413 is thus the number of pulses of the second clock signal 415 between the rising edge of the capture enable signal 412 and the rising edge of the shift enable signal 411 or between the rising edge of the capture status pulse 417 and the rising edge of the first shift gating pulse in one or more shift gating pulses 416. Using the frequency ratio of the second clock signal 415 vs. the first clock signal 413, the delay length determination device 410 can be configured to determine the value of delay length.

For a low frequency ratio of the second clock signal 415 versus the first clock signal 413, the delay caused by other devices in the interfacing circuit (e.g., the first transition detection device 440) may be sufficient so that no additional delay generated by the delay generating device 400 is needed. In such a case, the delay selection signal 421 can be set to be inactive. Thus, the delay length determination device 410 can generate the delay selection signal 421 also based on the number of pulses of the second clock signal 415 between the rising edge of the capture status pulse 417 and the rising edge of the first shift gating pulse in one or more shift gating pulses 416.

Figure 5:
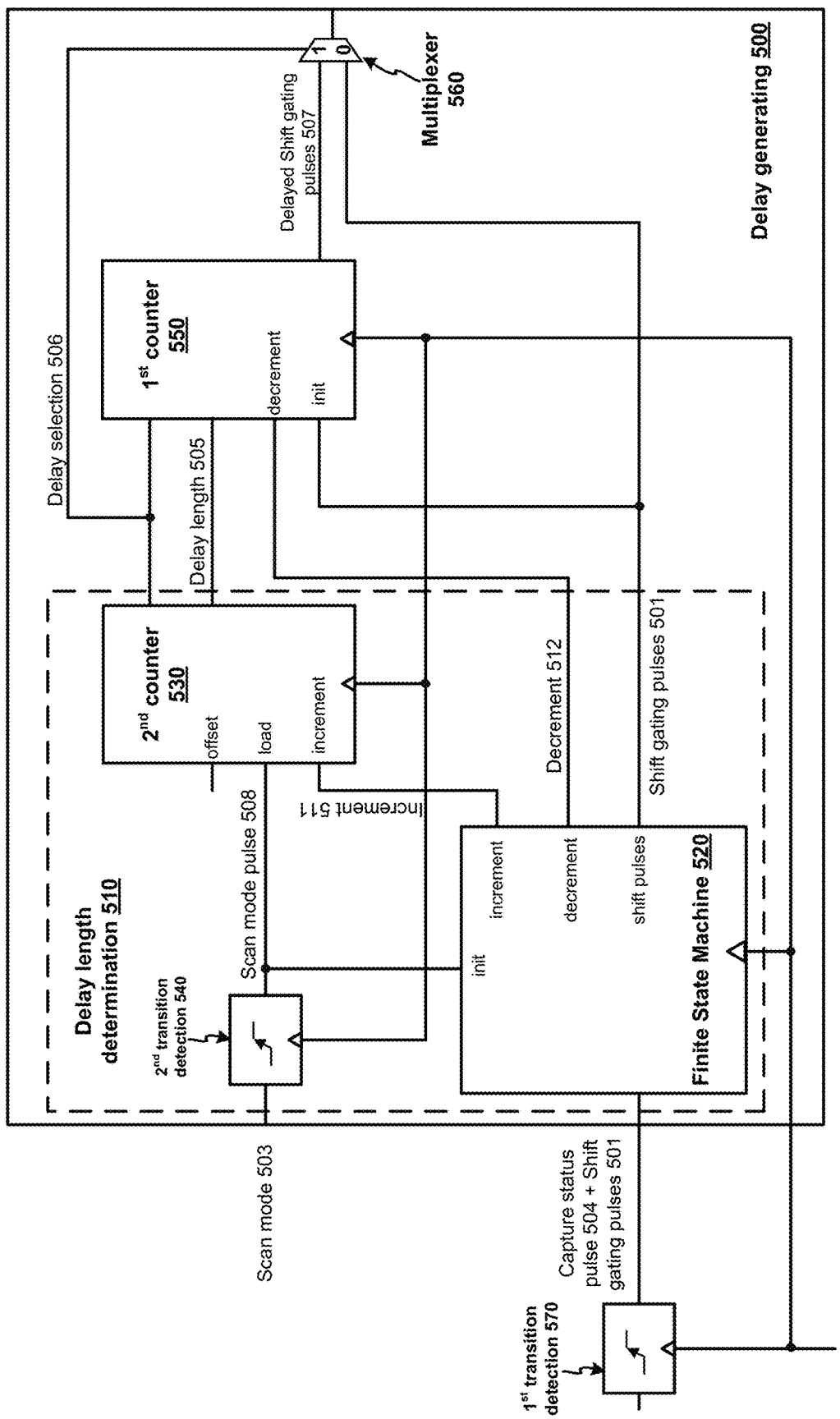
FIG. 5 illustrates an example of a block diagram of a delay length determination device in a delay generating device according to various embodiments of the disclosed technology.

FIG. 5 illustrates an example of a block diagram of a delay length determination device 510 in a delay generating device 500 according to various embodiments of the disclosed technology. The delay length determination device 510 comprises a second transition detecting device 540, a second counter 530, and a finite state machine 520, all clocked by a second clock signal 502. Beside the delay length determination device 510, the delay generating device 500 comprises a first counter 550 and a multiplexer 560. FIG. 5 also shows a first transition detecting device 570 configured to generate a capture status pulse 504 and one or more shift gating pulses 501 which are coupled to the delay generating device 500. The first counter 550 and the first transition detecting device 570 are also clocked by the second clock signal 502.

In the delay length determination device 510, the second transition detecting device 540 is configured to generate a scan mode pulse 508 when detecting a transition of a scan mode signal 503. The second transition detecting device 540 and the first transition detecting device 570 can both be implemented using the transition detecting device 800 shown in FIG. 8. In addition to be the input signal of the second transition detecting device 540, the scan mode signal 503 can serve as the scan enable signal for scan elements clocked by the second clock signal 502, similar to the scan mode signal 113 in FIG. 1. The generated scan mode pulse 508 has a width equal to a clock period of the second clock signal 502. The scan mode pulse 508 is coupled to the initiation port of the finite state machine 520 and the load port of the second counter 530.

The second counter 530 is configured to generate a delay length signal 505 and a delay selection signal 506 based on the scan mode pulse 508 and an increment signal 511 from the finite state machine 520. The second counter 530 stops counting when the increment signal 511 is inactive. With some implementations of the disclosed technology, the second counter 530 can be implemented using an up counter. The up counter can count starting from 0 or an offset value. The offset value can be used to offset the delay caused by some device(s) outside of the delay generating device 500 such as the first transition detection device 570. The second counter 530 can count the number of pulses of the second clock signal 502 during a period when the increment signal 511 is active or a shorter period if the offset value is non-zero. As shown below, the period when the increment signal 511 is active is equal to a period between the rising edge of the capture status pulse 504 and the rising edge of the first shift gating pulse in one or more shift gating pulses 501. The delay length signal 505 can be set as one half of the number of pulses of the second clock signal 502 counted. The delay selection signal 506 can be set to be "0" or "1" also based on the number of pulses of the second clock signal 502 counted.

The finite state machine 520 is configured to generate the increment signal 511 and a decrement signal 512 for the first counter 550 and to block the capture status pulse 504 but allow the one or more shift gating pulses 501 to be coupled to an initiation input of the first counter 550 and the multiplexer 560. Like the first counter 420 in FIG. 4, the first counter 550 is configured to generate one or more delayed shift gating pulses 507 based on the delay length signal 505. The first counter 550 stops counting when the decrement signal 512 is inactive.

The scan mode pulse 508, coupled to an initiation input of the finite state machine 520 can cause both the increment signal 511 and the decrement signal 512 to be inactive. The capture status pulse 504 can cause only the increment signal 511 to be active while leaving the decrement signal 512 to be inactive, and the first shift gating pulse in the one or more shift gating pulses 501 can cause the increment signal 511 to be inactive and the decrement signal 512 to be active. Thus, based on the scan mode pulse 508, the capture status pulse 504, or the first shift gating pulse in the one or more shift gating pulses 501, the finite state machine 520 can rotate through the above three states. In the latter two of these three states, the one or more shift gating pulses 501 can pass through the finite state machine 520 while the capture status pulse 504 is blocked.

Figure 6:
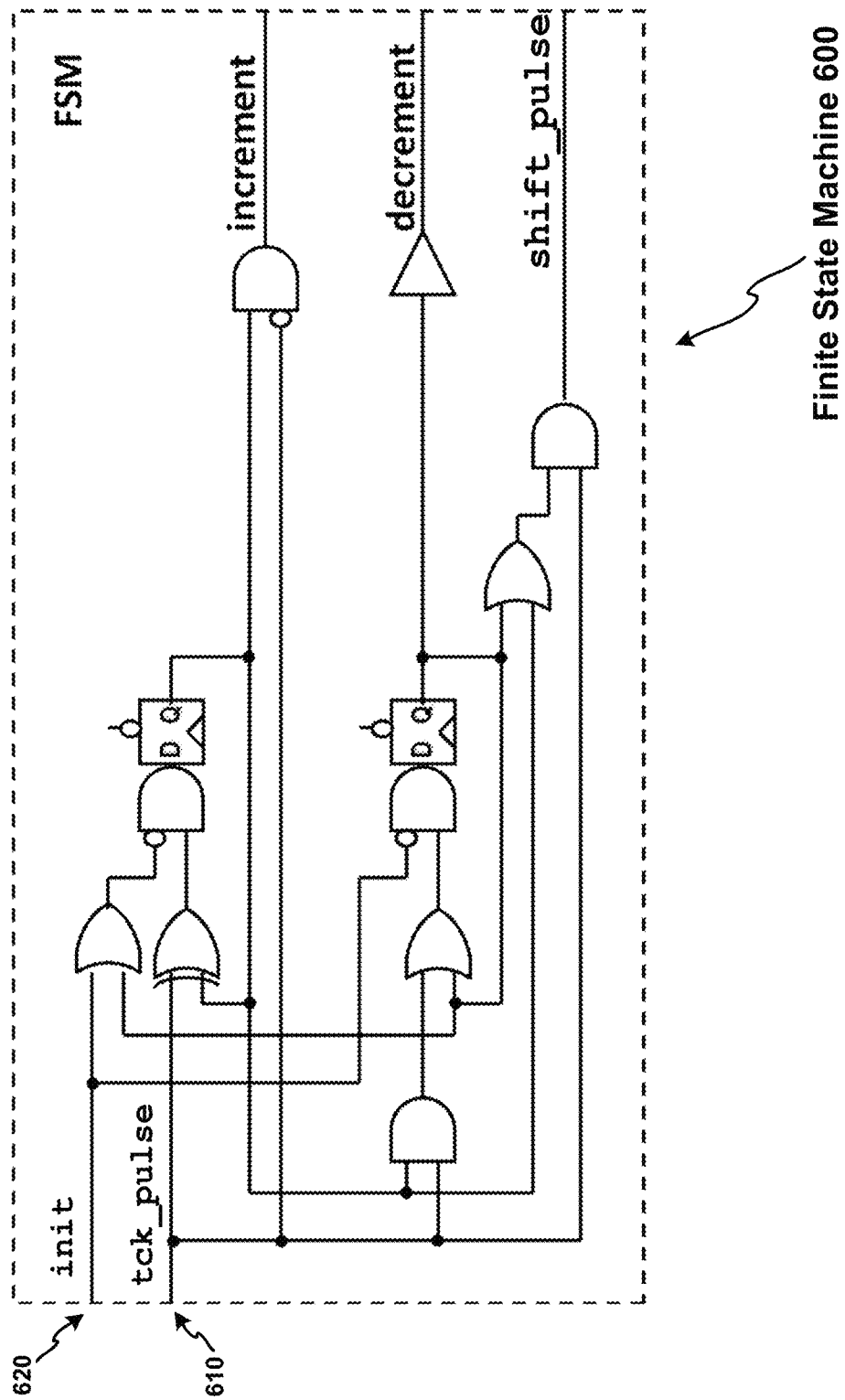
FIG. 6 illustrates an example of a block diagram of a finite state machine that can be used to implement the finite state machine in the delay length determination device according to various embodiments of the disclosed technology.

FIG. 6 illustrates an example of a block diagram of a finite state machine 600 that can be used to implement the finite state machine 520 in FIG. 5 according to various embodiments of the disclosed technology. An input, "tck_pulse" 610, of the finite state machine 600 can be coupled to signals like the capture status pulse 504 and the one or more shift gating pulses 501 in FIG. 5, and another input, "init" 620, of the finite state machine 600 can be coupled to a signal like the scan mode pulse 508 in FIG. 5.

Figure 7:
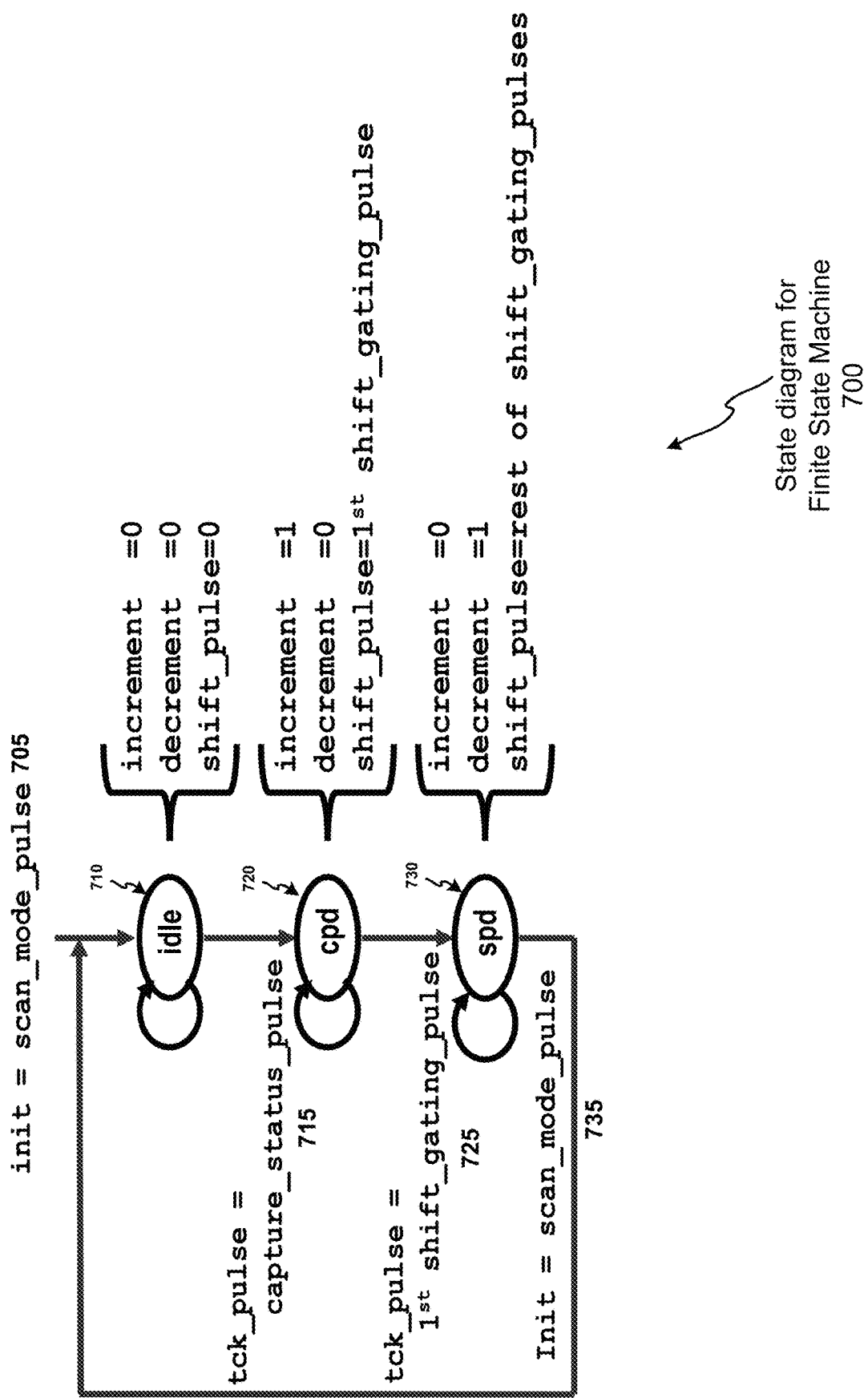
FIG. 7 illustrates an example of a state diagram for a finite state machine according to various embodiments of the disclosed technology.

FIG. 7 illustrates an example of a state diagram 700 for the finite state machine 520 according to various embodiments of the disclosed technology. As shown in the figure, an initial scan mode pulse 705 can cause the finite state machine to enter the first state 710. In this state, both the increment signal and the decrement signal are inactive and no pulses are outputted from the shift_pulse output of the finite state machine. Then, a capture status pulse 715 can cause the finite state machine to enter the second state 720. In this state, only the increment signal becomes active and the first shift gating pulse passes through the finite state machine. Then, the first shift gating pulse 725 can cause the finite state machine to enter the third state 730. In this state, the increment signal becomes inactive and the decrement signal becomes active. The finite state machine stays in the third state 730 when the following shift gating pulses arrive and pass through. Another scan mode pulse 735 can cause the finite state machine to return to the first state 710.

Figure 9:
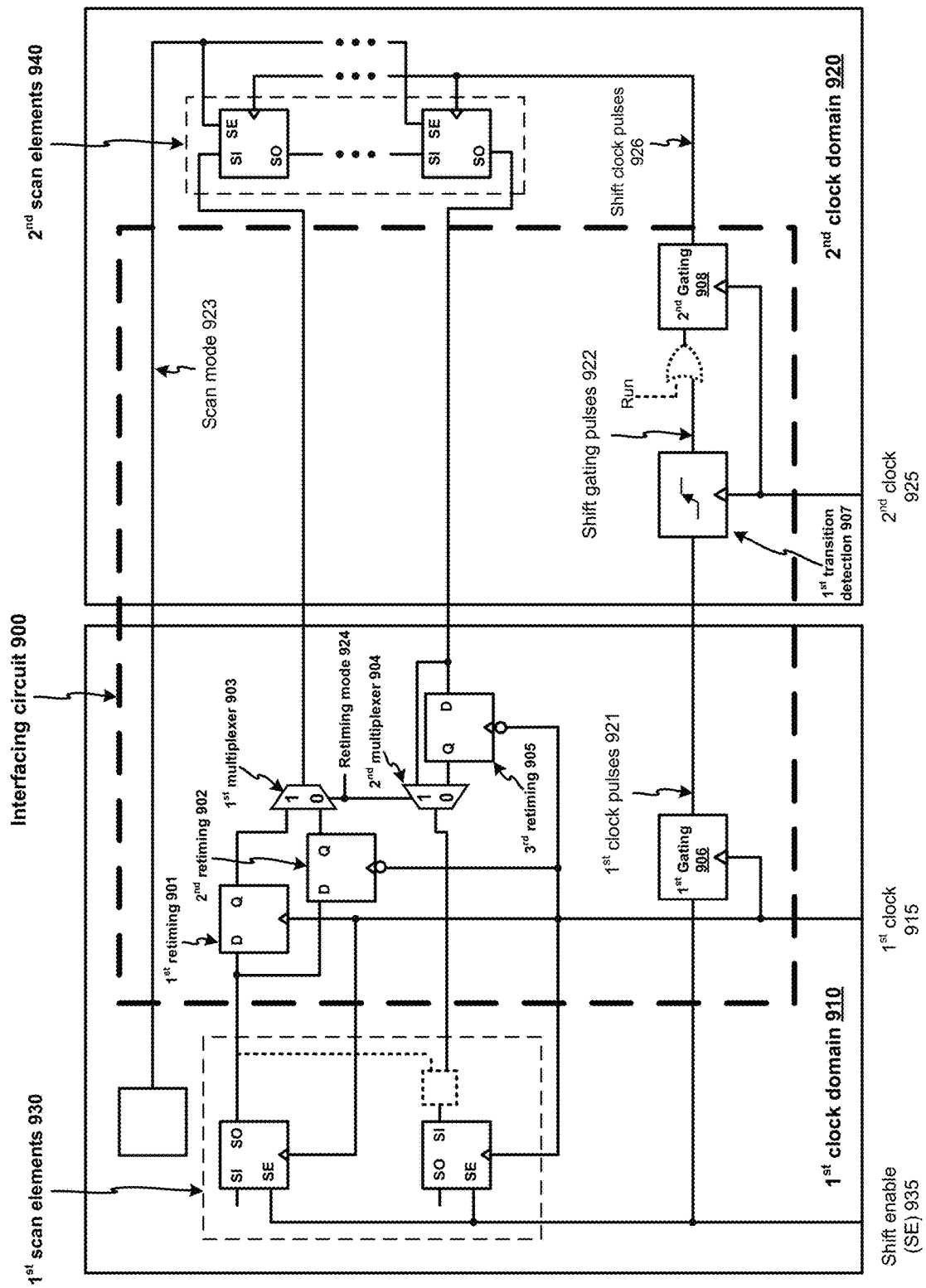
FIG. 9 illustrates an example of a block diagram of an interfacing circuit comprising more than one retiming devices according to various embodiments of the disclosed technology.

FIG. 9 illustrates an example of a block diagram of an interfacing circuit 900 comprising more than one retiming devices according to various embodiments of the disclosed technology. The interfacing circuit 900 comprises: a first retiming device 901, a second retiming device 902, a first multiplexer 903, a third retiming device 905, a second multiplexer 904, a first clock gating device 906, a first transition detecting device 907, and a second clock gating device 908. Among them, the first transition detecting device 907 and the second clock gating device 908 are clocked by a second clock signal 925, and the rest are clocked by a first clock signal 915. In particular, the first retiming device 901 is triggered by active pulse edges of the first clock signal 915 while the second retiming device 902 and the second retiming device 905 are triggered by inactive pulse edges of the first clock signal 915.

Like the first clock gating device 150, the first clock gating device 906 is configured to select, based on a shift enable signal 935, first clock pulses 921 in the first clock signal 915 that are used by first scan elements 930 in a first time domain 910 during a shift operation. Like the first transition detecting device 160 and the second clock gating device 180, the first transition detecting device 907 and the second clock gating device 908 are configured to generate shift clock pulses 926 of the second clock signal 925 based on and in synchronization with the first clock pulses 921. The first transition detecting device 907 can cause the shift clock pulses 926 to be delayed by one or more clock cycles of the second clock signal 925 with respect to the corresponding first clock pulses 921. The shift clock pulses 926 can clock second scan elements 940 in a second clock domain 920 during the same shift operation. As such, the first scan elements 930 and the second scan elements 940 can form a whole or portion of a scan chain for the shift operation. Again, while the first scan elements 930 is shown to have only two scan elements in FIG. 9, the first scan elements 930 can have many more scan elements.

A serial output of one of the first scan elements 930 is coupled to an input of the first retiming device 901 and an input of the second retiming device 902. An output of the first retiming device 901 and an output of the second retiming device 902 are coupled to two inputs of the first multiplexer 903, respectively. The first multiplexer 903 can select either of them as a signal to be coupled to a serial input of one of the second scan elements 940 based on a retiming mode signal 924. An input of the third retiming device 905 is coupled to a serial output of one of the second scan elements 940. The second multiplexer 904 is configured to select either an output of the third retiming device 905 or the serial output of one of the second scan elements 940 as a signal to be coupled to a serial input of one of the first scan elements 930 based on the retiming mode signal 924. If the retiming mode signal 924 is at "1", the scan path will go through the first retiming device 901, but not the second retiming device 902 or the third retiming device 905, similar to the one shown in FIG. 1. If the retiming mode signal 924 is at "0", the scan path will go through the second retiming device 902 and the third retiming device 905 instead. The former scan path is good for some low frequency ratios, e.g., greater than or equal to 4 but smaller than or equal to 8. The latter scan path is good for high frequency ratios, e.g., greater than 8. The retiming mode signal 924 may be set accordingly.

Figure 10:
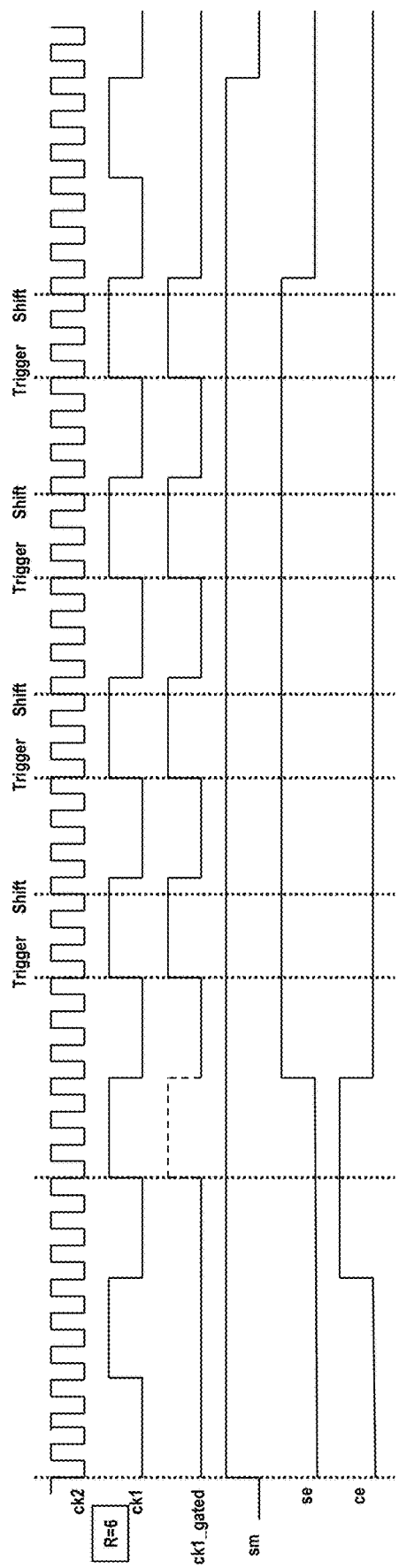
FIG. 10 illustrates an example of waveforms of some clock and control signals for an interfacing circuit comprises a delay generating device according to various embodiments of the disclosed technology.

FIG. 10 illustrates an example of waveforms of some clock and control signals for an interfacing circuit comprises a delay generating device according to various embodiments of the disclosed technology. For ease of understanding, the waveforms will be described with reference to the interfacing circuit 100 in FIG. 1. In FIG. 10, the two clock signals 115 and 116 for the interfacing circuit 100 are labeled as "ck1" and "ck2", respectively. The frequency ratio of ck2 vs. ck1 is 6. The scan mode signal 113, the shift enable signal 111, and the capture enable signal 112 are labeled as "sm", "se" and "ce", respectively. The signal labeled as "ck1_gated" is generated by the first gating device 150 and serves as the input signal for the first transition detection device 160. Based on the ce and se signals, the second pulse of the ck1 signal is used for a capture operation and the third through sixth pulses of the ck1 signal are used for a shift operation. The ck1_gated signal is shown to have five pulses: the one in dotted line corresponding to the capture clock pulse and the other four corresponding to the shift clock pulses, all for the first scan elements 130 clocked by the ck1 signal. The rising edges of the shift clock pulses are labeled as "Trigger". The interfacing circuit 100 generates the shift clock pulses 104 for the second scan elements 140 by gating the ck2 signal. Due to the delay introduced by the interfacing circuit 100, the rising edges of the shift clock pulses 104 are close to the falling edge of the corresponding shift pulses of the ck1 signal (50% of the period of the ck1 signal) and are labeled as "Shift" in the ck2 signal. As noted previously, the shift time at 50% of the period of the ck1 signal is the optimal shift position for the second scan elements.

Figure 11:
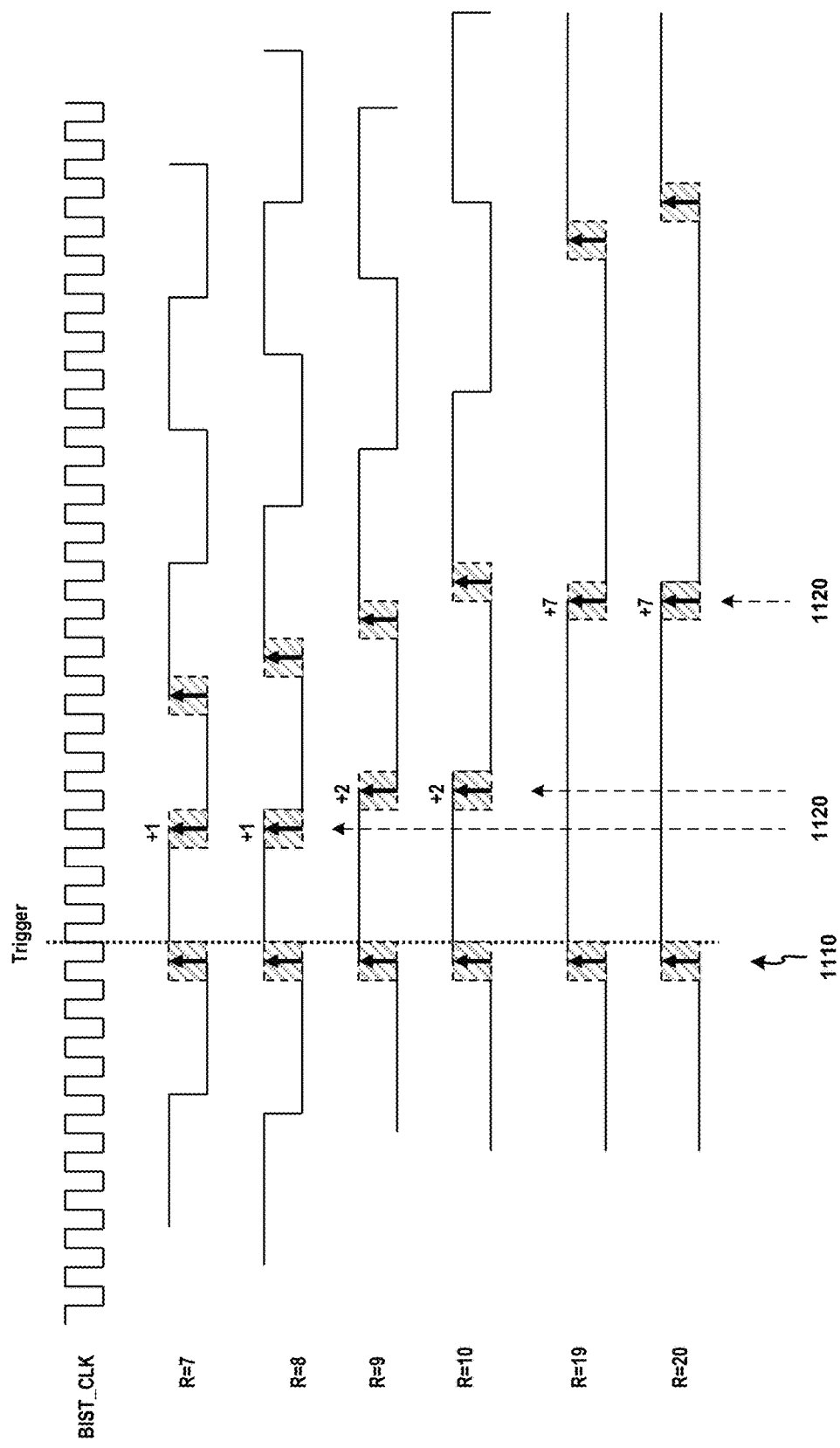
FIG. 11 illustrates an example of waveforms of clock signals having different frequency ratios for an interfacing circuit comprising a delay generating device according to various embodiments of the disclosed technology.

FIG. 11 illustrates an example of waveforms of clock signals having different frequency ratios for an interfacing circuit comprising a delay generating device according to various embodiments of the disclosed technology. For ease of understanding, the waveforms will be described with reference to the delay generating device 500 in FIG. 5. On the top of FIG. 5 is a waveform for the second clock signal 502, labeled as BIST_CLK. The next six waveforms represent the first clock signals with frequency ratios (labeled as "R") being 7, 8, 9, 10, 19 and 20, respectively. The rising edge 1110 of a clock pulse of the first clock signals corresponds to the shift time for the first scan elements, and the falling edge 1120 of the same clock pulse corresponds to the optimal shift time for the second scan elements. To be near the optimal shift time, the delay length determination device 510 needs to determine the delay length 505. To account for the inherent delay caused by the devices in the interfacing circuit such as the first transition detection 570, an offset value is set to be 6 for the second counter 530. The second counter 530 then counts the remaining pulses of the second clock signal 502 within a period of the first clock signal. For R=7, 8, 9, 10, 19, and 20, the counts will be 1, 2, 3, 4, 13, and 14, respectively. The second counter 530 then divides the count by 2 and rounds up the result, which leads to delay length values being 1, 1, 2, 2, 7 and 7 for R=7, 8, 9, 10, 19, and 20, respectively, as shown in the figure.

Figure 12:
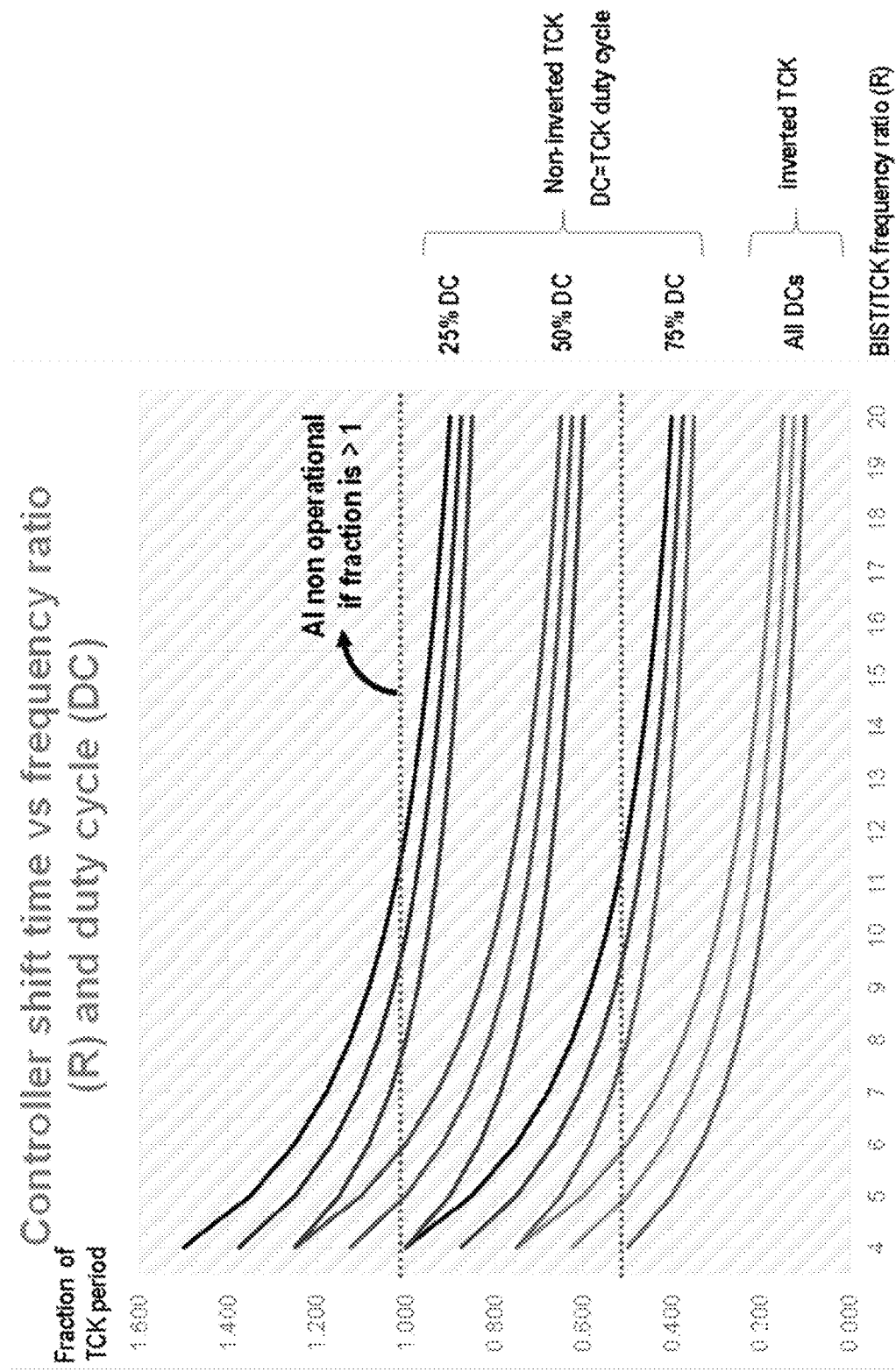
FIG. 12 illustrates an example of a diagram showing shift time of the register associated with the test controller as a function of frequency ratio of the system clock signal over TCK for some TCK duty cycles for an asynchronous interface according to an embodiment of the technology disclosed in U.S. Pat. No. 5,900,753.
Figure 13:
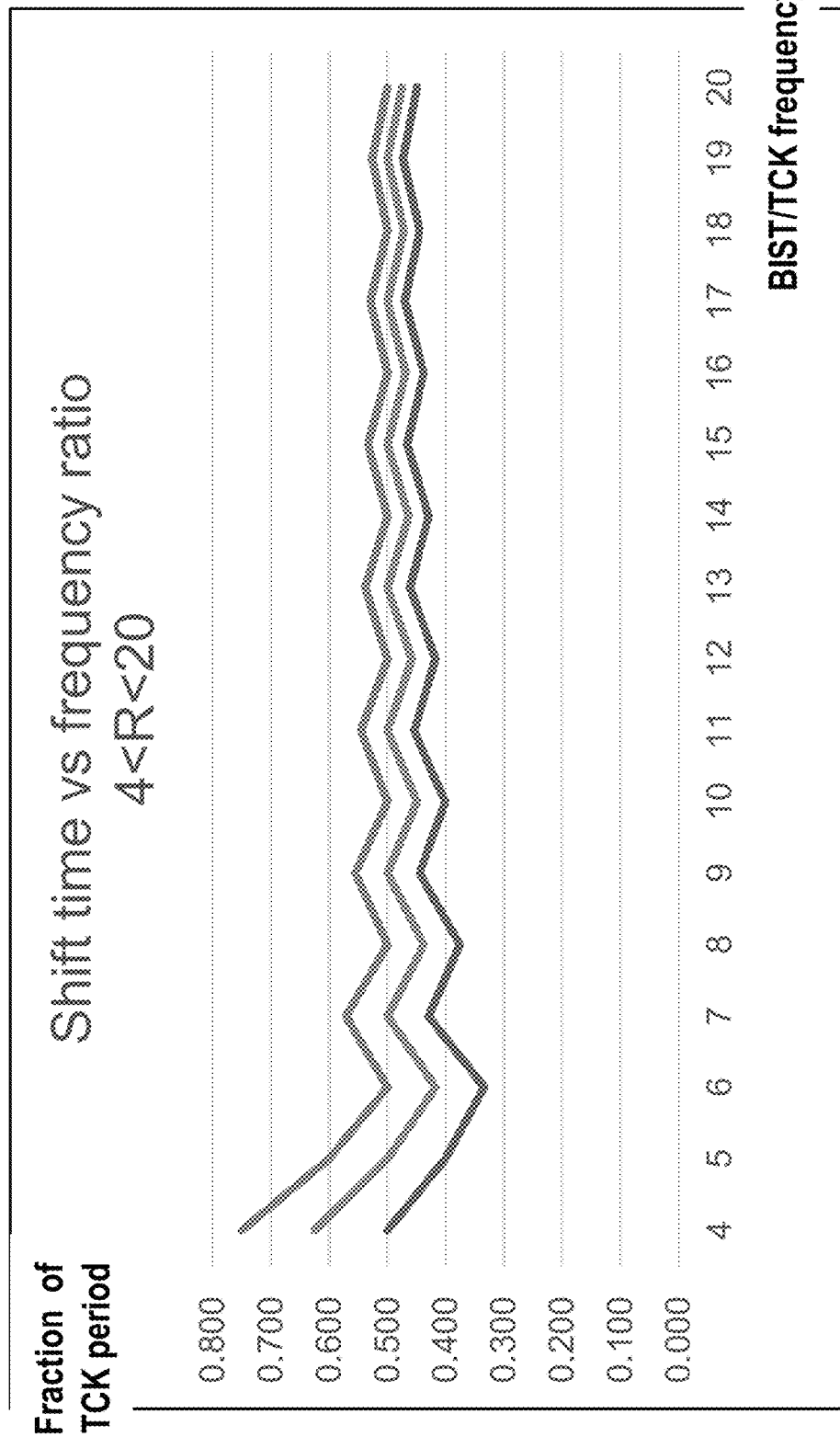
FIG. 13 illustrates an example of a diagram showing shift time as a function of frequency ratio for an interfacing circuit comprising a delay generating device according to various embodiments of the disclosed technology.

FIG. 13 illustrates an example of a diagram showing shift time as a function of frequency ratio for an interfacing circuit comprising a delay generating device according to various embodiments of the disclosed technology. The shift time, represented as a fraction of clock period of the first clock signal for the first clock domain, is for the shift operation of scan elements in the second clock domain. The frequency ratio is calculated by dividing the frequency for the second clock signal by the one for the first clock signal. The diagram has three curves: the top one representing the maximum values, the middle one representing the average values, and the bottom one representing the minimum values. The duty cycle of the first clock signal has no impact on the curves because the delay of the clock pulses of the second clock signal for the shift operation is determined with respect to the rising edge rather than the falling edge of clock pulses of the first clock signal. Thus, FIG. 13 does not show different curves for different duty cycles as FIG. 12 does. Moreover, the shift time moves toward the rising edge of the shift clock pulse in the first clock domain as the frequency ratio increases in FIG. 12 while the shift time fluctuates around 50% of clock period of the first clock signal. The average shift time is exactly 50% of the clock period for odd frequency ratios and slightly lower than 50% for even frequency ratios. This is inevitable as the resolution of the delay is +/−one period of the second clock cycle. The resolution also leads to the result that the higher the frequency ratio, the better the shift time. In summary, the disclosed technology can reduce the sensitivity of shift time over both the frequency ratio and the duty cycle.

Figure 14:
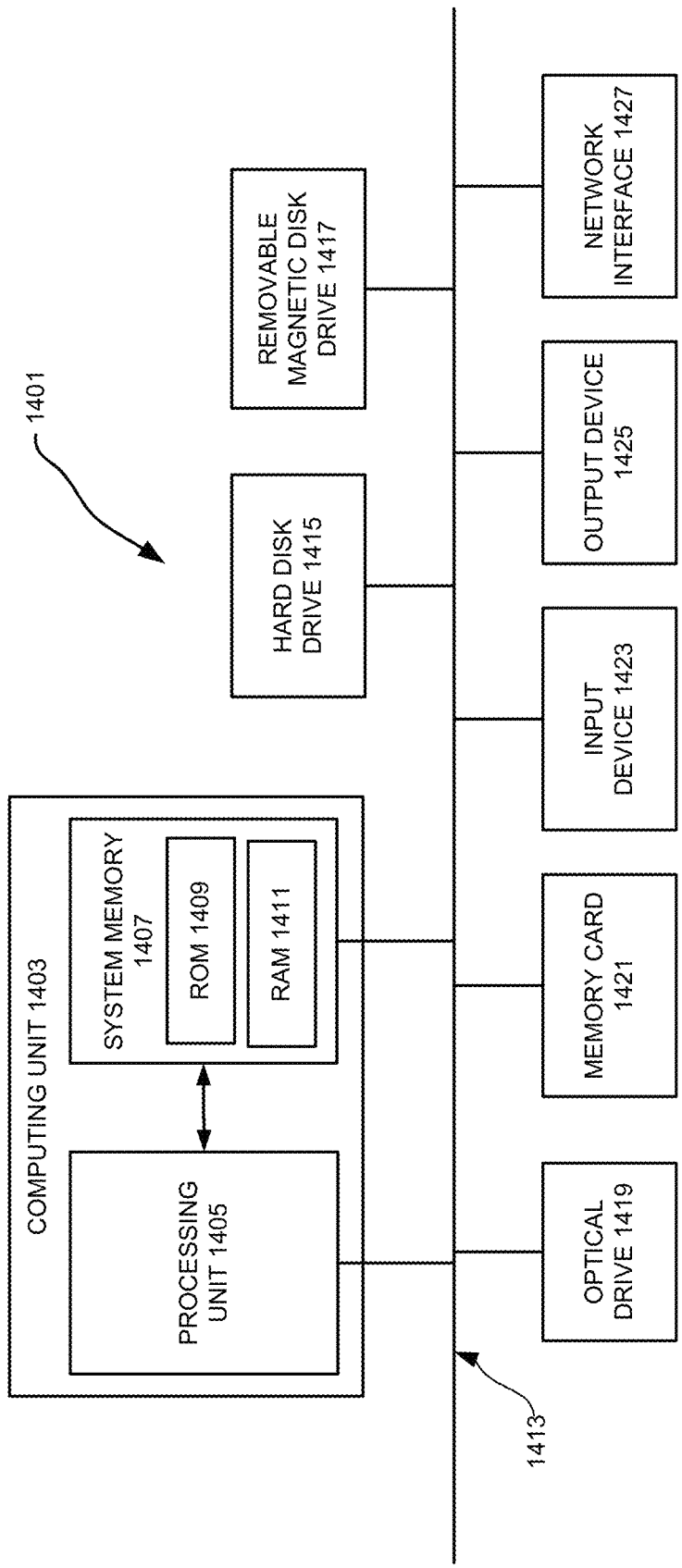
FIG. 14 illustrates a programmable computer system with which various embodiments of the disclosed technology may be employed.

Various examples of the disclosed technology may be implemented through the execution of software instructions by a computing device, such as a programmable computer. Accordingly, FIG. 14 shows an illustrative example of a computing device 1401. As seen in this figure, the computing device 1401 includes a computing unit 1403 with a processing unit 1405 and a system memory 1407. The processing unit 1405 may be any type of programmable electronic device for executing software instructions, but it will conventionally be a microprocessor. The system memory 1407 may include both a read-only memory (ROM) 1409 and a random access memory (RAM) 1411. As will be appreciated by those of ordinary skill in the art, both the read-only memory (ROM) 1409 and the random access memory (RANI) 1411 may store software instructions for execution by the processing unit 1405.

The processing unit 1405 and the system memory 1407 are connected, either directly or indirectly, through a bus 1413 or alternate communication structure, to one or more peripheral devices. For example, the processing unit 1405 or the system memory 1407 may be directly or indirectly connected to one or more additional memory storage devices, such as a "hard" magnetic disk drive 1415, a removable magnetic disk drive 1417, an optical disk drive 1419, or a flash memory card 1421. The processing unit 1405 and the system memory 1407 also may be directly or indirectly connected to one or more input devices 1423 and one or more output devices 1425. The input devices 1423 may include, for example, a keyboard, a pointing device (such as a mouse, touchpad, stylus, trackball, or joystick), a scanner, a camera, and a microphone. The output devices 1425 may include, for example, a monitor display, a printer and speakers. With various examples of the computer 1401, one or more of the peripheral devices 1415-1425 may be internally housed with the computing unit 1403. Alternately, one or more of the peripheral devices 1415-1425 may be external to the housing for the computing unit 1403 and connected to the bus 1413 through, for example, a Universal Serial Bus (USB) connection.

With some implementations, the computing unit 1403 may be directly or indirectly connected to one or more network interfaces 1427 for communicating with other devices making up a network. The network interface 1427 translates data and control signals from the computing unit 1403 into network messages according to one or more communication protocols, such as the transmission control protocol (TCP) and the Internet protocol (IP). Also, the interface 1427 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 1401 is illustrated as an example only, and it is not intended to be limiting. Various embodiments of the disclosed technology may be implemented using one or more computing devices that include the components of the computer 1401 illustrated in FIG. 14, which include only a subset of the components illustrated in FIG. 14, or which include an alternate combination of components, including components that are not shown in FIG. 14. For example, various embodiments of the disclosed technology may be implemented using a multi-processor computer, a plurality of single and/or multiprocessor computers arranged into a network, or some combination of both.

CONCLUSION

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the disclosed technology. Rather, the scope of the disclosed technology is defined by the following claims and their equivalents. We therefore claim as our disclosed technology all that comes within the scope and spirit of these claims.

What is claimed is:

1. A circuit configurable to interface first scan elements in a first clock domain clocked by a first clock signal and second scan elements in a second clock domain clocked by a second clock signal to form a whole or portion of a scan chain for a shift operation, comprising:
   a first clock gating device clocked by the first clock signal and configured to generate one or more first clock pulses when a shift enable signal is active;
   a first transition detecting device clocked by the second clock signal and configured to generate one or more shift gating pulses when detecting active transitions of the one or more first clock pulses, width of each of the one or more shift gating pulses being equal to a clock period of the second clock signal;
   a second clock gating device clocked by the second clock signal and configured to generate one or more shift clock pulses based on the one or more shift gating pulses to clock the second scan elements for the shift operation; and
   a first retiming device triggered by active pulse edges of the first clock signal and configurable to hold a value to be shifted into one of the second scan elements from one of the first scan elements for each of the one or more first clock pulses during the shift operation.

2. The circuit recited in claim 1, further comprising:
   a delay generating device clocked by the second clock signal and configured to delay each of the one or more shift gating pulses by a number of clock cycles of the second clock signal to generate one or more delayed shift gating pulses based on control signals, one of the control signals being a delay length signal indicating the number of clock cycles of the second clock signal.

3. The circuit recited in claim 2, wherein the delay generating device comprises:
   a multiplexer configured to select either the one or more shift gating pulses or the one or more delayed shift gating pulses as an output signal of the delay generating device based on a delay selection signal in the control signals; and a first counter clocked by the second clock signal and configured to generate the one or more delayed shift gating pulses based on the delay length signal, the one or more shift gating pulses being coupled to an initiation input of the first counter, each of the one or more shift gating pulses causing the first counter to start counting when the delay selection signal causes the multiplexer to select the one or more delayed shift gating pulses as the output signal of the delay generating device.

4. The circuit recited in claim 3, wherein the delay length signal and the delay selection signal are supplied by a register in the first clock domain.

5. The circuit recited in claim 3, wherein the delay selection signal causes the multiplexer to select the one or more delayed shift gating pulses as the output signal of the delay generating device when frequency of the second clock signal is at least six times higher than frequency of the first clock signal.

6. The circuit recited in claim 3, wherein the first clock gating device is further configured to generate one first clock pulse when a capture enable signal is active, and the delay generating device comprises:
a delay-length determining device configured to generate the delay length signal and the delay selection signal based on two pulses: a capture status pulse generated by the first transition detecting device when detecting an active transition of the one first clock pulse and a first shift gating pulse in the one or more shift gating pulses.

7. The circuit recited in claim 6, wherein the delay-length determining device comprises:
a second transition detecting device clocked by the second clock signal and configured to generate a scan mode pulse when detecting a transition of a scan mode signal, width of the scan mode pulse being equal to a clock period of the second clock signal;
a second counter clocked by the second clock signal and configured to generate the delay length signal and the delay selection signal based on the scan mode pulse and an increment signal, the second counter stopping counting when the increment signal is inactive; and
a finite state machine clocked by the second clock signal and configured to generate the increment signal and an decrement signal and to block the capture status pulse but allow the one or more shift gating pulses to be coupled to the initiation input of the first counter,
wherein the scan mode pulse causes both the increment signal and the decrement signal to be inactive, the capture status pulse causes only the increment signal to be active, and the first shift gating pulse causes the increment signal to be inactive and the decrement signal to be active.

8. The circuit recited in claim 1, further comprising:
a second retiming device triggered by inactive pulse edges of the first clock signal, an input of the second retiming device being coupled to a serial output of the one of the first scan elements;
a first multiplexer configured to select either an output of the first retiming device or an output of the second retiming device as a signal to be coupled to a serial input of the one of the second scan elements based on a retiming mode signal;
a third retiming device triggered by inactive pulse edges of the first clock signal, an input of the third retiming device being coupled to a serial output of one of the second scan elements; and
a second multiplexer configured to select either an output of the third retiming device or the serial output of one of the second scan elements as a signal to be coupled to a serial input of one of the first scan elements based on the retiming mode signal.

9. One or more non-transitory computer-readable media storing computer-executable instructions for causing a computer to perform a method, the method comprising:
creating, in a circuit design, a circuit configurable to interface first scan elements in a first clock domain clocked by a first clock signal and second scan elements in a second clock domain clocked by a second clock signal to form a whole or portion of a scan chain for a shift operation, the circuit comprising:
a first clock gating device clocked by the first clock signal and configured to generate one or more first clock pulses when a shift enable signal is active;
a first transition detecting device clocked by the second clock signal and configured to generate one or more shift gating pulses when detecting active transitions of the one or more first clock pulses, width of each of the one or more shift gating pulses being equal to a clock period of the second clock signal;
a second clock gating device clocked by the second clock signal and configured to generate one or more shift clock pulses based on the one or more shift gating pulses to clock the second scan elements for the shift operation; and
a first retiming device triggered by active pulse edges of the first clock signal and configurable to hold a value to be shifted into one of the second scan elements from one of the first scan elements for each of the one or more first clock pulses during the shift operation.

10. The one or more non-transitory computer-readable media recited in claim 9, wherein the circuit further comprises:
a delay generating device clocked by the second clock signal and configured to delay each of the one or more shift gating pulses by a number of clock cycles of the second clock signal to generate one or more delayed shift gating pulses based on control signals, one of the control signals being a delay length signal indicating the number of clock cycles of the second clock signal.

11. The one or more non-transitory computer-readable media recited in claim 10, wherein the delay generating device comprises:
a multiplexer configured to select either the one or more shift gating pulses or the one or more delayed shift gating pulses as an output signal of the delay generating device based on a delay selection signal in the control signals; and
a first counter clocked by the second clock signal and configured to generate the one or more delayed shift gating pulses based on the delay length signal, the one or more shift gating pulses being coupled to an initiation input of the first counter, each of the one or more shift gating pulses causing the first counter to start counting when the delay selection signal causes the multiplexer to select the one or more delayed shift gating pulses as the output signal of the delay generating device.

12. The one or more non-transitory computer-readable media recited in claim 11, wherein the delay length signal and the delay selection signal are supplied by a register in the first clock domain.

13. The one or more non-transitory computer-readable media recited in claim 11, wherein the delay selection signal causes the multiplexer to select the one or more delayed shift gating pulses as the output signal of the delay generating device when frequency of the second clock signal is at least six times higher than frequency of the first clock signal.

14. The one or more non-transitory computer-readable media recited in claim 11, wherein the first clock gating device is further configured to generate one first clock pulse when a capture enable signal is active, and the delay generating device comprises:
- a delay-length determining device configured to generate the delay length signal and the delay selection signal based on two pulses: a capture status pulse generated by the first transition detecting device when detecting an active transition of the one first clock pulse and a first shift gating pulse in the one or more shift gating pulses.

15. The one or more non-transitory computer-readable media recited in claim 14, wherein the delay-length determining device comprises:
- a second transition detecting device clocked by the second clock signal and configured to generate a scan mode pulse when detecting a transition of a scan mode signal, width of the scan mode pulse being equal to a clock period of the second clock signal;
- a second counter clocked by the second clock signal and configured to generate the delay length signal and the delay selection signal based on the scan mode pulse and an increment signal, the second counter stopping counting when the increment signal is inactive; and
- a finite state machine clocked by the second clock signal and configured to generate the increment signal and an decrement signal and to block the capture status pulse but allow the one or more shift gating pulses to be coupled to the initiation input of the first counter, wherein the scan mode pulse causes both the increment signal and the decrement signal to be inactive, the capture status pulse causes only the increment signal to be active, and the first shift gating pulse causes the increment signal to be inactive and the decrement signal to be active.

16. The one or more non-transitory computer-readable media recited in claim 9, wherein the circuit further comprises:
- a second retiming device triggered by inactive pulse edges of the first clock signal, an input of the second retiming device being coupled to a serial output of the one of the first scan elements;
- a first multiplexer configured to select either an output of the first retiming device or an output of the second retiming device as a signal to be coupled to a serial input of the one of the second scan elements based on a retiming mode signal;
- a third retiming device triggered by inactive pulse edges of the first clock signal, an input of the third retiming device being coupled to a serial output of one of the second scan elements; and
- a second multiplexer configured to select either an output of the third retiming device or the serial output of one of the second scan elements as a signal to be coupled to a serial input of one of the first scan elements based on the retiming mode signal.

* * * * *